(12) United States Patent
Varekamp

(10) Patent No.: US 10,699,466 B2
(45) Date of Patent: Jun. 30, 2020

(54) APPARATUS AND METHOD FOR GENERATING A LIGHT INTENSITY IMAGE

(71) Applicant: KONINKLIJKE PHILIPS N.V., Eindhoven (NL)

(72) Inventor: Christiaan Varekamp, Veldhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 16/465,606

(22) PCT Filed: Nov. 28, 2017

(86) PCT No.: PCT/EP2017/080597
§ 371 (c)(1),
(2) Date: May 31, 2019

(87) PCT Pub. No.: WO2018/104102
PCT Pub. Date: Jun. 14, 2018

(65) Prior Publication Data
US 2019/0385352 A1    Dec. 19, 2019

(30) Foreign Application Priority Data

Dec. 6, 2016 (EP) .................................... 16202469

(51) Int. Cl.
*G06T 15/04* (2011.01)
*H04N 13/128* (2018.01)
(Continued)

(52) U.S. Cl.
CPC ................ *G06T 15/04* (2013.01); *G06T 1/20* (2013.01); *G06T 15/205* (2013.01); *G06T 15/50* (2013.01);
(Continued)

(58) Field of Classification Search
CPC ......... G06T 15/04; G06T 1/20; G06T 15/205; H04N 13/128; H04N 13/111
See application file for complete search history.

(56) References Cited

U.S. PATENT DOCUMENTS 6,750,873 B1    6/2004  Bernardini et al.
8,867,823 B2   10/2014  Wildeboer et al.
(Continued)

OTHER PUBLICATIONS

Sun, W., Xu, L., Au, O. C., Chui, S. H., & Kwok, C. W. (Dec. 2010). An overview of free view-point depth-image-based rendering (DIBR). In APSIPA Annual Summit and Conference (pp. 1023-1030).*
(Continued)

*Primary Examiner* — Sarah Lhymn

(57) ABSTRACT

A method of generating an image comprises receiving (301, 303) a first and second texture map and mesh representing a scene from a first view point and second view point respectively. A light intensity image is generated (305) for a third view point. For a first position this includes determining (401, 403) a first and second light intensity value for the first position by a view point transformation based on the first texture map and the first mesh and on the second texture map and the second mesh respectively. The light intensity value is then determined (405) by a weighted combination of the first and second light intensity values. The weighting depends on a depth gradient in the first mesh at a first mesh position corresponding to the first position relative to a depth gradient in the second mesh at a second mesh position corresponding to the first position.

20 Claims, 7 Drawing Sheets

(51) Int. Cl.
   *H04N 13/111*   (2018.01)
   *G06T 1/20*     (2006.01)
   *G06T 15/20*    (2011.01)
   *G06T 15/50*    (2011.01)

(52) U.S. Cl.
   CPC ......... *H04N 13/111* (2018.05); *H04N 13/128* (2018.05); *G06T 2200/28* (2013.01)

(56) References Cited

U.S. PATENT DOCUMENTS

| | | |
|---|---|---|
| 9,117,310 B2 | 8/2015 | Coene et al. |
| 2016/0165215 A1 | 6/2016 | Gu et al. |
| 2016/0267672 A1 | 9/2016 | Ciurea et al. |
| 2019/0057545 A1 | 2/2019 | Varekamp |

OTHER PUBLICATIONS

Yucer, K., Kim, C., Sorkine-Hornung, A., & Sorkine-Hornung, O. (Oct. 2016). Depth from gradients in dense light fields for object reconstruction. In 2016 Fourth International Conference on 3D Vision (3DV) (pp. 249-257). IEEE.*

Zitnick et al "High Quality Video View Interpolation Using a Layered Representation" SIGGRAPH—2004 pp. 600-608.

Takeshi Takai and Adrian Hilton"Harmonized Texture Mapping" Jan. 2010, p. 1-9.

Sun et al An Overview of Free Viewpoint Depth-Image Based Rendering (DIBR) ION/SAM Jan. 17, 2010 p. 1-8.

Yin et al "A New Disocclusion Filling Approach in Depth Image Based Rendering for Stereoscopic Imaging" 2015 Interntional Conference on Control, Automation and Information Sciences, Oct. 29, 2015 p. 313-317.

Search Report dated Feb. 7, 2018.

* cited by examiner

APPARATUS AND METHOD FOR GENERATING A LIGHT INTENSITY IMAGE

CROSS-REFERENCE TO PRIOR APPLICATIONS

This application is the U.S. National Phase application under 35 U.S.C. § 371 of International Application No. PCT/EP2017/080597, filed on Nov. 28, 2017, which claims the benefit of EP Patent Application No. EP 16202469.9, filed on Dec. 6, 2016. These applications are hereby incorporated by reference herein.

FIELD OF THE INVENTION

The invention relates to an apparatus and method for generating a light intensity image, and in particular to generating a light intensity image for a new view point based on texture maps and meshes from a plurality of different view points suitable for accelerated hardware processing.

BACKGROUND OF THE INVENTION

Graphic applications based on three-dimensional scenes have become prevalent in many applications such as specifically computer graphic applications. In order to support fast three-dimensional graphics processing, a number of standards and specifications have been developed. This not only provides faster design and implementation as it may provide standardized functions and routines for many standard operations, such as view point shifting, but also allows for dedicated hardware graphic engines to be developed and optimized for these routines. Indeed, for many computers, the Graphic Processing Unit (GPU) may nowadays often be at least as powerful and important as the Central Processing Unit (CPU).

An example of a standard for supporting fast graphics processing is the OpenGL specification which provides an Applicant Process Interface (API) with a number of functions supporting graphics processing. The specification is typically used to provide hardware accelerated graphics processing with the specific routines being implemented by dedicated accelerated hardware in the form of a GPU.

In most such graphic specifications, the representation of the scene is by a combination of a texture map and a three-dimensional mesh. Indeed, a particularly effective approach in many scenarios is to represent image objects, or indeed the scene as a whole, by a polygon mesh where a set of polygons are connected by their common edges or corners (vertices), which are given by three-dimensional positions. The combined three-dimensional polygon mesh accordingly provides an effective model of three-dimensional objects, including possibly a three-dimensional description of an entire image. The polygon mesh is often a triangle mesh formed by triangles having common corners given in 3D space.

As an example, a stereo camera may record an image of a scene from a given view point. For each pixel, a disparity estimation may be performed to estimate the distance to the object represented by the pixel. This may be performed for each pixel thereby providing a three-dimensional position of x,y,z for each pixel. These positions may then be used as vertices for a triangle mesh with two triangles being formed for each group of 2×2 pixels. As this may result in a large number of triangles, the process may include combining some initial triangles into larger triangles (or in some scenarios more generally into larger polygons). This will reduce the number of triangles but also decrease the spatial resolution of the mesh. Accordingly, it is typically dependent on the depth variations and predominantly done in flatter areas.

Each vertex is further associated with a light intensity value of the texture map. The texture map essentially provides the light/color intensity in the scene for the object at the pixel position for the vertex. Typically, a light intensity image/texture map is provided together with the mesh with each vertex containing data representing the x, y, z position of the vertex and u,v data identifying a linked position in the texture map, i.e. it points to the light intensity at the x, y, z position as captured in the texture map.

In such representations, the polygon mesh is used to provide information of the three-dimensional geometry of the objects whereas the texture is typically provided as a separate data structure. Specifically, the texture is often provided as a separate two-dimensional map which by the processing algorithm can be overlaid on the three-dimensional geometry.

The use of triangle meshes is particularly suitable for processing and manipulation by computer graphics algorithms, and many efficient software and hardware solutions have been developed and are available in the market. A substantial computational efficiency is in many of the systems achieved by the algorithm processing the individual vertices commonly for a plurality of polygons rather than processing each polygon separately. For example, for a typical triangle mesh, the individual vertex is often common to several (often 3-8) triangles. The processing of a single vertex may accordingly be applicable to a relatively high number of triangles thereby substantially reducing the number of points in an image or other object that is being processed.

As a specific example, many current Systems on Chip (SoCs) contain a GPU which is highly optimized for processing of 3D graphics. For instance, the processing of 3D object geometry and 3D object texture is done using two largely separate paths in the so called OpenGL rendering pipeline (or in many other APIs such as DirectX). The hardware of GPUs on SoCs can deal efficiently with 3D graphics as long as the 3D source is presented to the GPU in the form of vertices (typically of triangles) and textures. The OpenGL application interface then allows setting and control of a virtual perspective camera that determines how 3D objects appear as projected on the 2D screen. Although OpenGL uses 3D objects as input, the output is typically a 2D image suitable for a normal 2D display.

However, such approaches require the three-dimensional information to be provided by a polygon mesh and associated texture information. Whereas this may be relatively easy to provide in some applications, such as e.g. games based on fully computer generated virtual scenes and environments, it may be less easy in other embodiments. In particular, in applications that are based on capturing real scenes, it requires that these are converted into a texture and mesh representation. This may, as previously mentioned, be based on stereo images or on an image and depth representation of the scene. However, although a number of approaches for performing such a conversion are known, it is not trivial and poses a number of complex problems and challenges.

A common operation in graphics processing is view point changes where an image is generated for a different view point than that of the input texture map and mesh. Graphic APIs typically have functions for very efficiently performing such view point transformations. However, as the input mesh typically is not perfect, such view point transformations may result in quality degradation of the shift is too significant. Further, a representation of a scene from a view point will typically include a number of occluded elements where a foreground object occludes elements behind it. These elements may be visible from the new direction, i.e. the view point change may result in de-occlusion. However, the input texture map and mesh will in such a case not comprise any information for these de-occluded parts. Accordingly, they cannot be optimally represented as the required information is not available.

For these reasons, view point transformation is often based on a plurality of texture maps and meshes corresponding to different view directions. Indeed, in order to synthesize a new (unseen) viewpoint, it is typically preferred or even necessary to combine multiple captured meshes with associated camera images (textures) from the different view-points. The main reason for combining data from different view-points is to recover objects that are hidden (occluded) in one view but visible in another view. This problem is often referred to as view-point interpolation.

However, conventional approaches for this still tend to be suboptimal.

For example, one approach for generating a new view-point is to transform the meshes originating from the different view-points to a single world coordinate system and then perform a perspective projection onto a new camera plane. These steps can be done in standard graphics hardware. However, this will typically not correctly show hidden surfaces. Specifically, graphics hardware uses depth testing to select the front-most point when points are combined at a single pixel. This approach is used to address self-occlusion where the view point shifting may result in image objects moving relative to each other such that new occlusions occur, i.e. at the new view point there may be an occlusion for two points that are not occluded from the original view point. However, when applied to different images this may result in errors or degradations. Indeed, the depth is typically linearly interpolated such that it extends beyond foreground objects (like a halo effect), the front-most point will often correspond to areas that may be occluded due being next to a foreground object.

An example of a technique for view-interpolation based on depth images is provided in C. L. Zitnick et. al. "High-quality video view interpolation using a layered representation". SIGGRAPH '04 ACM SIGGRAPH 2004, pp. 600-608. To achieve high quality, the technique uses a two-layer representation consisting of a main layer and a boundary layer (around depth transitions). These are constructed using alpha matting (accounting for transparency) and both are warped (and mixed with other views) during the render process. A drawback of this approach is the need to disconnect the mesh to generate the two-layer representation. This process needs to select a threshold for the depth map and erase triangles of the corresponding mesh at depth discontinues. This is not desirable since using thresholds can potentially decrease temporal stability in the rendering.

Hence, an improved approach for generating images for a different view point would be advantageous and in particular an approach that allows increased flexibility, increased accuracy, reduced complexity, improved computational efficiency, improved compatibility with existing graphic processing approaches, improved image quality, improved de-occlusion performance, and/or improved performance would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided a method of generating a light intensity image, the method comprising: receiving a first texture map and a first mesh representing a scene from a first view point; receiving a second texture map and a second mesh representing the scene from a second view point; determining the light intensity image representing the scene from a third view point in response to the first texture map, the first mesh, the second texture map and the second mesh; wherein determining the light intensity image comprises for a first position in the light intensity image performing the steps of: determining a first light intensity value for the first position by a view point transformation based on the first texture map and the first mesh; determining a second light intensity value for the first position by a view point transformation based on the second texture map and the second mesh; determining a light intensity value for the light intensity image at the first position by a weighted combination of the first light intensity value and the second light intensity value; a weighting of the first light intensity value relative to the second light intensity value by the weighted combination being dependent on a first depth gradient in the first mesh at a first mesh position corresponding to the first position relative to a second depth gradient in the second mesh at a second mesh position corresponding to the first position.

The invention may in many embodiments provide improved generation of a light intensity image for a given view point based on texture maps and meshes from other view points. In many scenarios, improved representation of areas that are de-occluded with respect to one of the input view points, but not the other, is achieved. The approach may in particular in many embodiments provide improved quality around edges of foreground objects.

The approach may avoid the generation of mesh holes known from other approaches and may provide improved depth consistency.

A particular advantage of the approach is that it may in many embodiments be closely supported by standard graphic routines. For example, the view point transformations may in many embodiments be performed by standardized, dedicated, and optimized graphic processing hardware. For example, the approach may be compatible with standardized graphic processes and may utilize these efficiently. Indeed, the approach may be compatible with such standardized approaches, such as e.g. the OpenGL specification, by limiting non-standard approaches to parts of the rendering/processing pipeline which allows user adaptation. E.g. the combination may be performed as part of the fragment shader stage of an OpenGL rendering pipeline.

The possibility of using standardized hardware accelerated processing for resource intensive elements of the processing may substantially increase e.g. the speed or capacity of the system. It may reduce the complexity and or resource requirements in many embodiments.

The approach may allow an adaptation of the combination such that it automatically weighs texture maps with higher pixel density for a given area higher than texture maps with lower pixel densities.

In some embodiments, the view point transformation for the first light intensity value may comprise applying a mesh view point transformation from the first view point to the third view point to the first mesh to generate a transformed mesh, determining a position in the transformed mesh corresponding to the first position in response to a perspective mapping for the third view point, determining a polygon of the transformed mesh comprising the position in the transformed mesh, and determining the first light intensity value as an interpolation of light intensity values in the first texture map linked to vertices of the polygon.

It will be appreciated that other approaches for view point transformation may be used in other embodiments.

The first and or second depth gradients may be represented by any value or parameter that provide an indication of a depth gradient at the corresponding position in the appropriate mesh.

In some embodiments, the combination may include additional light intensity values derived from texture maps and meshes for other view points.

A mesh may be a three dimensional mesh wherein each vertex is associated with (has) a three dimensional position. Each vertex may specifically be represented by at least a three dimensional spatial position x, y, z. Each vertex of a mesh may further be linked with a position in the corresponding texture map. For example, for each vertex, a position u,v in the texture map corresponding to the spatial position x, y, z may be stored.

A mesh may include information relating to the depths of the represented objects but is not limited thereto (e.g. as described, vertices may be represented by three dimensional coordinates rather than merely by a depth coordinate).

A mesh position in an input mesh for an input view point corresponding to the first position may be the position in the input mesh which by the view point transformation will be transformed to the first position. Equivalently, the mesh position in an input mesh for an input view point corresponding to the first position may be the position in the input mesh which is linked to a position in the texture map which by the view point transformation will be transformed to the first position.

Specifically, the first mesh position may be the position in the first mesh which by the view point transformation will be transformed/mapped to the first position (or similarly the first mesh position may be the position in the first mesh linked to a position in the first texture map which by the view point transformation will be transformed/mapped to the first position). Similarly, the second mesh position may be the position in the second mesh which by the view point transformation will be transformed/mapped to the first position (or similarly the second mesh position may be the position in the second mesh linked to a position in the second texture map which by the view point transformation will be transformed/mapped to the first position).

The weighted combination may apply a weight to the first light intensity value which relatively to a weight of the second light intensity value depends on the first depth gradient relative to the second depth gradient.

Depth may e.g. be represented by a disparity, e.g. a depth map may be an indication of a disparity map.

In accordance with an optional feature of the invention, the weighting of the first light intensity value relative to the second light intensity value is a monotonically decreasing function of the absolute value of the first depth gradient.

This may provide improved performance and may in particular in many scenarios bias the combination towards light intensity values that represent non-occluded rather than occluded values in the input texture maps.

In some embodiments, a weighting of the second light intensity value may at the same time be a monotonically decreasing function of the absolute value of the second depth gradient.

In accordance with an optional feature of the invention, the weighting of the first light intensity value relative to the second light intensity value is a monotonically increasing function of the absolute value of the second depth gradient.

This may provide improved performance and may in particular in many scenarios bias the combination towards light intensity values that represent non-occluded rather than occluded values in the input texture maps.

In some embodiments, a weighting of the second light intensity value may at the same time be a monotonically increasing function of the absolute value of the first depth gradient.

In accordance with an optional feature of the invention, the method further comprises determining depth gradients for at least some vertices of the first mesh; and determining the first depth gradient in response to the depth gradients for the at least some vertices.

This may provide a particularly efficient implementation with high performance in many embodiments.

The phrase "absolute value" will further be denoted as "magnitude".

In accordance with an optional feature of the invention, determining the depth gradients comprises determining a depth gradient for a vertex of the at least some vertices of the first mesh in response to a depth of the vertex, a depth of at least one other vertex of the first mesh, and a distance between the vertex and the at least one other vertex. This may provide a particularly efficient implementation with high performance in many embodiments.

In accordance with an optional feature of the invention, determining depth gradients comprises determining a depth gradient for a vertex of the at least some vertices of the first mesh in response to depth gradients from the vertex to a plurality of neighboring vertices.

This may provide a particularly efficient implementation with high performance in many embodiments. It may in particular allow improved detection of depth transitions in any direction from a given vertex. The depth gradient may e.g. be determined as an averaging or maximum of depth gradients from the first vertex to a plurality of neighboring vertices.

In accordance with an optional feature of the invention, further comprising determining the first depth gradient in response to depth variations in a depth map for the first texture map.

This may provide a particularly efficient implementation with high performance in many embodiments. It may in particular allow lower complexity determination of suitable depth gradients. The depth map may for example be a depth map (including specifically a disparity map) used to generate the mesh. The depth map may for example be an original depth map provided by a camera capturing the scene and generating the depth map in association with an image that can be used as the texture map. In accordance with an optional feature of the invention, the method further comprises the steps of: determining a depth gradient map for the first texture map; applying a view point transformation to the depth gradient to generate a view transformed depth gradient map, and determining the first depth gradient in response to a depth gradient at a position in the view transformed depth gradient map corresponding to the first position.

This may provide a particularly efficient operation and may reduce resource requirements and/or increase processing speed substantially. In particular, it may in many embodiments allow standardized hardware acceleration to be used for resource critical elements of the process.

In accordance with an optional feature of the invention, the method further comprises the steps of: determining a weight map comprising weights for the weighted combination in response to the depth gradients; applying a view point transformation to the weight map to generate a view transformed weight map, and determining a weight for the weighted combination in response to a weight at the first position in the view transformed depth gradient map.

This may provide a particularly efficient implementation with high performance in many embodiments. It may provide a particularly efficient operation and may reduce resource requirements and/or increase processing speed substantially. In particular, it may in many embodiments allow standardized hardware acceleration to be used for resource critical elements of the process.

In accordance with an optional feature of the invention, the view point transformations for the first texture map, the second texture map, and at least one of the depth gradient map and the weight map are the same view point transformation.

The approach may allow extremely efficient and low complexity operation where the same optimized functionality (such as e.g. a GPU) can be reused for resource critical elements of the processing.

In accordance with an optional feature of the invention, the first texture map and the first mesh is generated from a capture of a real-life scene.

The approach may allow a high performance and efficient determination of images for new view points for a capture of a real-life scene and is not limited to e.g. images provided by virtual reality graphic engines.

In accordance with an optional feature of the invention, the weighting is further dependent on a difference between the first view point and the third view point.

This may improve performance in many embodiments.

In accordance with an optional feature of the invention, the weighting of the first light intensity value relative to the second light intensity value is further dependent on a reliability indication being indicative of a reliability of a depth estimation used to determine a depth at the first mesh position, in the first depth map, the weighting of the first light intensity value relative to the second light intensity value increasing for the reliability indication being indicative of an increasing reliability of the depth estimation.

This may improve performance in many embodiments.

According to an aspect of the invention there is provided an apparatus for generating a light intensity image, the apparatus comprising: a receiver for receiving a first texture map and a first mesh representing a scene from a first view point; a receiver for receiving a second texture map and a second mesh representing the scene from a second view point; an image generator for generating a light intensity image representing the scene from a third view point in response to the first texture map, the first mesh, the second texture map, and the second mesh; wherein the image generator comprises: a first view transformer for determining a first light intensity value for a first position in the light intensity image by a view point transformation based on the first texture map and the first mesh; a second view transformer for determining a second light intensity value for the first position by a view point transformation based on the second texture map and the second mesh; a combiner for determining a light intensity value for the light intensity image at the first position by a weighted combination of the first light intensity value and the second light intensity value; a weighting of the weighted combination being dependent a first depth gradient in the first mesh at a first mesh position corresponding to the first position relative to a second depth gradient in the second mesh at a second mesh position corresponding to the first position. These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

The following description focuses on embodiments of the invention applicable to a rendering of a two-dimensional image based on texture maps and meshes generated from capturing a real life three-dimensional scene from different view points (i.e. different camera views). However, it will be appreciated that the invention is not limited to this application but may be applied to e.g. generation of images based on computer generated depth maps and meshes for a virtual reality scene.

Many 3D image (including video) processing algorithms and processes are based on the use of triangle meshes as this may provide high computational efficiency in many embodiments. Depth meshes providing three-dimensional information together with an associated texture map is widely used in many graphic processing systems, such as specifically in computer graphics. A mesh may provide information of the geometric structure which includes depth information (but is of course not limited to only provide depth information, e.g. it may typically provide a three-dimensional coordinate for each vertex). For brevity, the combination of a mesh and its associated texture map will in the following also be referred to as a mesh image.

The approach is very suitable for flexibly modifying view directions when rendering the scene, and is particularly suitable for scenarios wherein the view point is not restricted to movements in a strict horizontal line but rather a free movement of the view point is desired. An efficient way to generate a new view-point is to transform the meshes originating from the different view-points to a single world coordinate system and then perform a perspective projection onto a new camera plane. These steps can be done in very efficiently using standard optimized graphics hardware, such as hardware based on the OpenGL standard. However, in order to optimize quality and provide additional information for areas which are being de-occluded by the view point transformations, the generation of a rendering image from a new view point is preferably based on texture maps and meshes provided for a plurality of different view points.

The Inventor has realized that this may often lead to sub-optimum results with artefacts and specifically to depth distortions and incorrect filling in of de-occluded areas.

Figure 1:
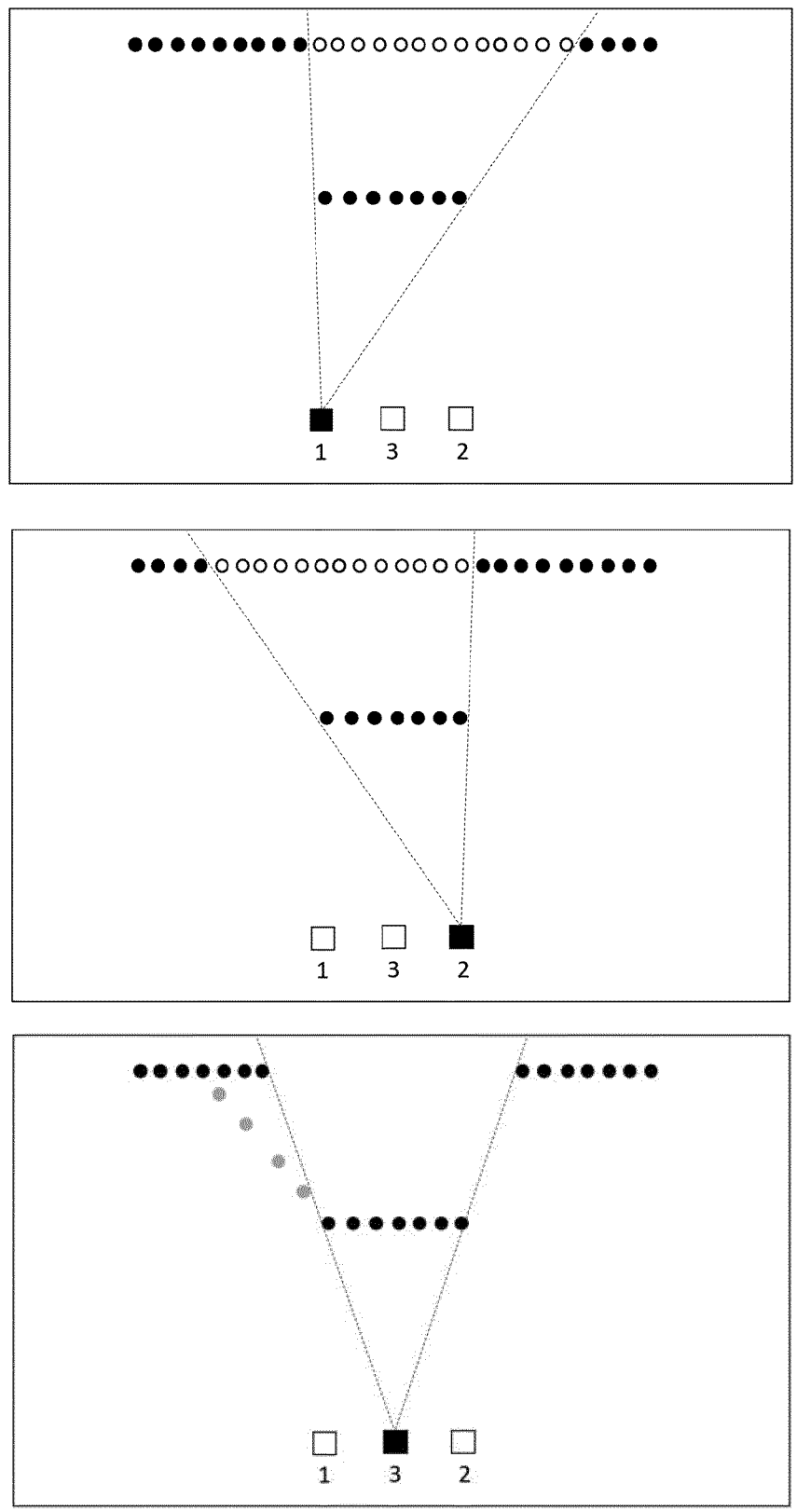
FIG. 1 illustrates an example of a view point transformation for a scene with one background object and a foreground object.

This may be illustrated by FIG. 1 which illustrates an example with one foreground object in front of one background object. In the examples, each point/dot can be considered to correspond to a scene position which may be represented by a vertex, and typically a dot may represent a pixel and indeed a vertex of the mesh. FIG. 1 illustrates an example where a mesh image is provided for a first view point 1 and for a second view point 2. Based on these mesh images, a two-dimensional image is generated for a third view point 3 between the first view point 1 and the second view point 2. Thus, in the example, the first and second view points 1,2 correspond to the camera view points when capturing the scene and view point 3 corresponds to the desired view point for the scene. The image is a light intensity image generated for rendering. It may directly reflect a light intensity value for the individual pixels of an image to be rendered/displayed by a display.

It will be appreciated that the light intensity values may be any value indicative of a light intensity, and may specifically be a light intensity for e.g. one color channel. For example, a light intensity value may be an R, G or B value of an RGB representation, or may e.g. be an Y value of an Yuv representation, or may indeed be a u or v value of such a Yuv representation. It is noted that the u and v values may be chroma values and that these also provide information relating to the light intensity of individual color channels when rendering. Thus, a light intensity value may be a luminance, chrominance, or indeed chroma value of a color representation.

In FIG. 1, the first figure illustrates the positions that are visible from view point 1 by block (solid) dots and the positions on the background object that are occluded by the foreground object are illustrated by white (non-solid) dots. The second figure illustrates the corresponding situation from view point 2. Thus, the two first sub-figures show the visibility of scene points for the two different cameras view points 1 and 2.

The third sub-figure illustrates the result of combining meshes and textures from view points 1 and 2 and warping (view point transforming) these into view point 3. The mesh originating from view point 2 will be locally stretched and a gap is formed (corresponding to the de-occlusion of part of the background object). The depth of the gap is linearly interpolated between points with different depth after projection into virtual view-point 3. The grey circles represent points that originate from view point 2 and which are interpolated linearly between the known 3D points in the mesh when projecting the scene in the camera coordinates of view point 3. Thus, the grey dots/points indicate depth positions which after the de-occlusion resulting from the view point transformation from view point 2 to view point 3 are generated to correspond to positions in the image from view point 3. These points lie closer to view point 3 than the black points behind them which represent points on the background object visible from view point 1.

However, when generating the image for view point 2, the typical approach is to select the front most position. Thus, rather than ideally selecting the black points originating from, and visible from, view point 1, the system will select the grey points originating from view point 2. Accordingly, the light intensity image value will at these points be generated based on the texture map of view point 2 rather than be based on the texture map of view point 1. This will result in the image for a de-occluded area being determined from the texture map in which the corresponding object was occluded instead of from the texture map in which the object was not occluded. As a result, the quality of the generated image is degraded and typically the elements of the de-occluded area are not accurately presented despite the appropriate information actually being available to the process.

It should be noted that although it is possible to modify the depth test logic as used in the standardized hardware, this can only be done for a given render call. It would therefore be necessary to split the mesh up again in parts with the earlier mentioned disadvantage of using thresholds. The standard depth test is part of the processing to address self-occlusion where the mesh from a separate view-point may fold onto itself (self-occlusion) with the depth test being used to resolve the resulting ambiguities.

In the following, an apparatus and method for generating a light intensity image from a plurality of meshes and associated texture maps for different view points will be described with reference to FIG. 2 which illustrates some exemplary elements of such an apparatus, and to FIG. 3 which illustrates some exemplary elements of such a method.

Figure 2:
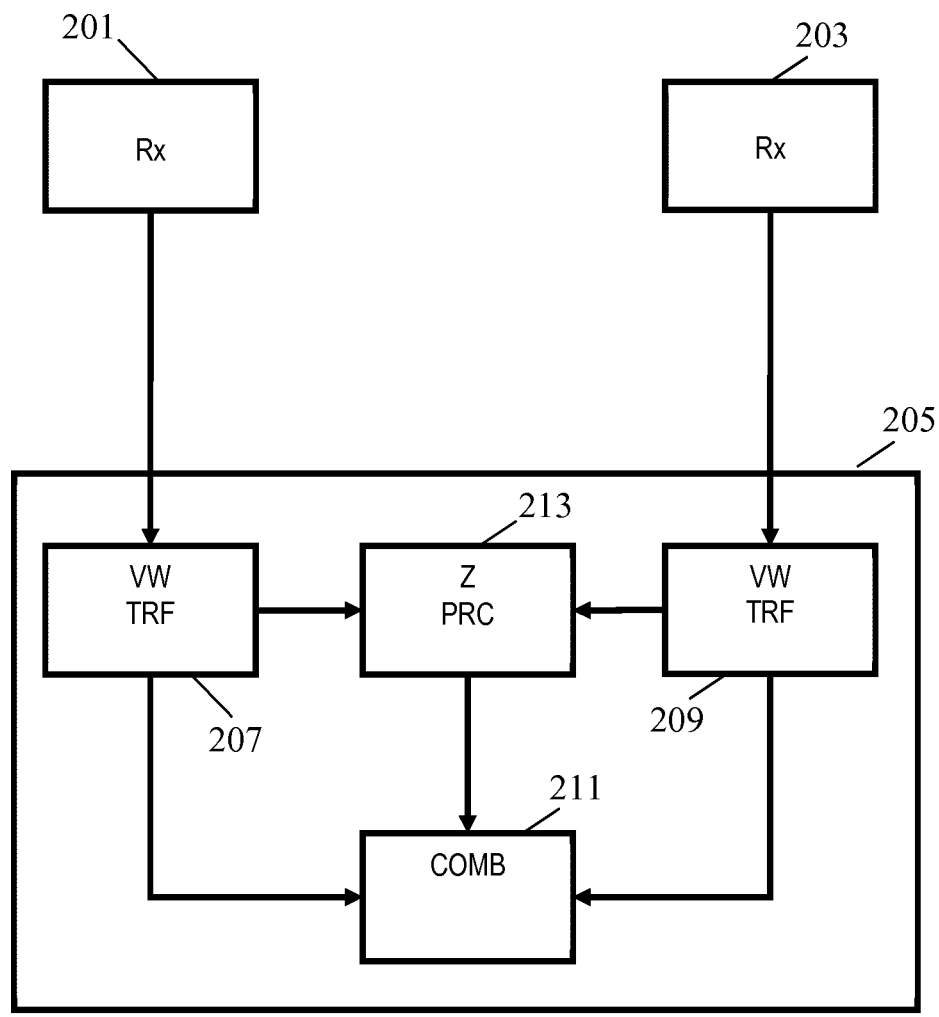
FIG. 2 illustrates an example of elements of an apparatus for generating an image in accordance with some embodiments of the invention.
Figure 3:
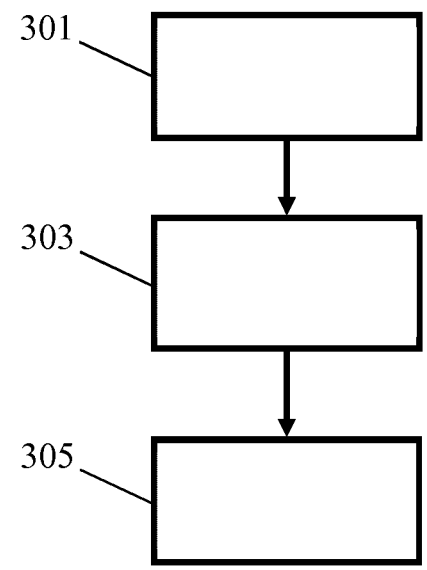
FIG. 3 illustrates an example of elements of a method for generating an image in accordance with some embodiments of the invention.

The approach of the apparatus and method of FIGS. 2 and 3 seeks to mitigate some of the described disadvantages. Specifically, rather than selecting the foremost point, the system is arranged to generate the light intensity values for the output image based on a weighted combination of the values of both the texture maps where the weighting is dependent on the corresponding depth gradients in the two meshes.

The apparatus comprises a first receiver 201 which performs step 301 wherein a first mesh image is received, i.e. a first mesh and a first texture map is received. The first mesh image represents a scene from a given view point.

The mesh image may be received from any internal or external source. For example, in some embodiments, the mesh image may be received from an external source e.g. via a communication system, or specifically via a network, such as e.g. the Internet. In some embodiments, the mesh image may be received from an internal source being operable to read a suitable distribution medium, for example the mesh image may be extracted from a DVD. In some embodiments, the mesh image may e.g. be extracted from a hard disk or local memory, or indeed in some embodiments the mesh image may be locally generated e.g. by a local virtual reality application.

In many embodiments the first texture map and the first mesh may be generated from a capture of a real life scene. The capture may be by a suitable set of cameras. For example, a single stereo camera or range camera may capture a real life scene and generate an image and a depth (/disparity) map. In other embodiments, a plurality of cameras at different positions may capture a two-dimensional image and a depth map may be generated from the captured images, e.g. by disparity estimation. One of the images may be used as a texture map and a mesh may be generated from the corresponding depth map. Thus, the mesh image may be an image which provides a capture of a real life scene with the texture map representing the light intensity values captured by the camera at the given view point and with the captured depth information being represented by the mesh. Thus, the mesh image provides limited information about the scene as it only represents the information that can be determined from the given view point (as opposed to e.g. a detailed geometric model being available as may be the case for e.g. a local virtual reality engine).

The apparatus further comprises a second receiver 203 which performs step 303 in which it receives a second mesh image, i.e. it receives a second texture map and a second mesh. The second mesh image provides a representation of the same scene but from a different view point. It will be appreciated that the comments provided with respect to the first mesh image apply equally to the second mesh image.

The first receiver 201 and the second receiver 203 are coupled to an image generator 205 which performs step 305 wherein a light intensity image representing the scene from a third view point is generated in response to the first texture map, the first mesh, the second texture map, and the second mesh. Thus, based on the first and second mesh image for respectively a first and second view point, an image is generated for a third view point. The first and second view points may typically be camera view points for the scene with the third view point representing the desired view point. The image is a light intensity image and may specifically correspond to an image that can be presented directly on a display to provide a view of the scene from the third view point. Specifically, the light intensity image may comprise a set of light intensity values with each light intensity value indicating the light intensity at a position of the image. Typically, the image may comprise a set of pixels with each pixel having one or more light intensity values. Thus, each light intensity value may correspond to a pixel value.

It will be appreciated that in some embodiments, each position (pixel) may be associated with/described by/defined by a single light intensity value. This may for example be the case for monochrome images. In other embodiments, each position (pixel) may be associated with/described by/defined by a plurality of light intensity values, such as e.g. one light intensity value for each channel of a color representation. Thus, the light intensity values may be considered color intensity values and the light intensity image may be a color intensity image. In case of a plurality of each pixel being represented by a plurality of light intensity values, such as e.g. corresponding to different color channels, the described approach may e.g. be applied individually to each color channel light intensity value.

The image generator 205 is thus arranged to generate images for different view points. For example, in some embodiments, the image generator 205 may be provided with an input defining a desired view point for example generated in response to a user input. The image generator 205 may then on the basis of the received mesh images generate an output display image corresponding to that view point. This image can then e.g. be rendered by a suitable display.

Figure 4:
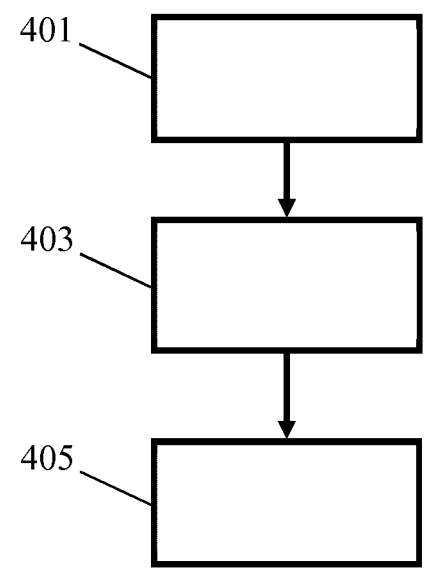
FIG. 4 illustrates an example of elements of a method for generating an image in accordance with some embodiments of the invention.

The operation of the image generator 205 will be described in more detail with reference to FIG. 2 and FIG. 4 which illustrates an example of an approach of the image generator 205.

The image generator 205 comprises a first view transformer 207 which performs step 401 in which the view point transformation is applied to the first mesh image with the view point transformation providing a view point transformation from the first view point to the third view point. Specifically, for a first position (typically a pixel position) in the light intensity image, the first view transformer 207 determines a light intensity value based on a view point transformation from the first view point to the third view point where the view point transformation is based on the first texture map and the first mesh.

Similarly, the image generator 205 comprises a second view transformer 209 which performs step 403 in which view point transformation is applied to the second mesh image with the view point transformation providing a view point transformation from the second view point to the third view point. Specifically, for the first position (typically a pixel position) in the light intensity image, the second view transformer 209 determines a second light intensity value based on a view point transformation from the second view point to the third view point where the view point transformation is based on the second texture map and the second mesh.

It will be appreciated that many different approaches are known for view point transformation based on a texture map and mesh, and that any suitable approach may be used without detracting from the invention.

In many embodiments, the view point transformations may advantageously comprise first applying a mesh view point transformation from the input view point to the output view point to the mesh. The person skilled in the art will be aware of various approaches for doing so and these will accordingly not be described in more detail. When determining a light intensity value for a given position in the output image for the third view point, the image generator 205 may then determine the position in the transformed mesh that corresponds to the given position. This may be done in response to a perspective projection from the third view point as will be known to the skilled person.

The image generator 205 may then determine the light intensity value by interpolating the texture map values of the vertices of the polygon in which the mesh position falls. The interpolation may be dependent on the distance of the mesh position to the individual vertices.

For example, in the original mesh before transformation, each vertex may have an associated position in the coordinate system based on the current view point (e.g. x, y, z coordinates are defined for each vertex). In addition, each vertex will point to a specific light intensity value/pixel value in the corresponding texture map, i.e. a set of two dimensional texture map coordinates (u,v) are also stored for each vertex.

The view point transformation of the mesh results in a modification of the vertex positions such that the x,y,z values will be transformed to appropriate coordinates in a coordinate system of the third view point. The point on the mesh corresponding to the first position in the light intensity image will be determined, and the vertices of the polygon in which this falls will be identified. The distance from the point to each of the vertices will be determined and for each vertex the light intensity image of the texture map at the u,v position of the vertex are determined. The light intensity value for the first position is then determined by a weighted interpolation of these texture map values with the weights being dependent on the distances to the individual vertex.

As another example a view point transformation may be performed as follows:

1. Project the 3D triangular mesh into the view-point for the output image (i.e. the third view point) using perspective projection 2. For each 2D pixel position in the output image:
   a. Determine in which mesh polygon it falls;
   b. Determine its 3D position in the original coordinate system of the mesh using the 3D triangle vertex coordinates and linear interpolation;
   c. Determine the (u,v) texture coordinate in the input texture map using the (u,v) texture coordinates of the triangle vertices and linear interpolation;
   d. Set the pixel value of the output image to be the texture value at location (u,v) of the texture map.

It will be appreciated that other view point transformations may be used in other embodiments.

Based on the view point transformations, the first view transformer 207 and the second view transformer 209 accordingly generate output images that correspond to the third view point. However, due to the view point transformation, some areas of the images may have de-occluded areas. However, these will often be different for the different images.

The first view transformer 207 and the second view transformer 209 are coupled to a combiner 211 which performs step 407 wherein an output light intensity value for the light intensity image is generated by combining the images from the two view transformers 207, 209. Specifically, for a given (pixel) position in the output image, the combiner 211 applies a weighted combination of a first light intensity value at the position in the image generated by the first view transformer 207 and a second light intensity value at that position in the image generated by the second view transformer 209.

The weighting of the weighted combination is dependent on the relative depth gradient for the corresponding positions in the meshes. Specifically, the weighting is dependent on a depth gradient indication in the first mesh at a mesh position corresponding to the first position relative to a depth gradient indication in the second mesh at a mesh position corresponding to the first position. Thus, the weighting depends on the relative depth gradients at the position. It will be appreciated that the depth gradients may be determined in different ways in different embodiments and that any indication of a value or magnitude of a depth gradient may be considered a representation of that depth gradient. For example, in some embodiments, the depth gradient may be represented by a binary value simply indicating with a depth gradient is above or below a threshold.

The combiner 211 may specifically decrease the weight for increasing gradients. For example, in many embodiments, the weighting of the first light intensity value from the first view transformer 207 may be a monotonically decreasing function of a magnitude of the gradient in the first mesh. Equivalently, the weighting of the first light intensity value from the first view transformer 207 may be a monotonically increasing function of a magnitude of the gradient in the second mesh. The same may symmetrically be applicable to the weighting of the second light intensity value from the second view transformer 209. The weight of each texture may specifically be inversely proportional to the local gradient magnitude in the depth/disparity map or mesh that is associated with each texture.

Thus, the output light value is not merely selected as the front-most point but rather a gradual combination based on the depth gradients (the rate of change in depth in the image) is performed. The approach thus biases towards the light intensity values for flatter areas while biasing away from areas with high depth changes, such as specifically depth transitions.

The Inventor has realized that such a depth gradient based adaptive weighted combination may provide improved images in many scenarios, and typically may provide substantially improved performance and image quality.

Figure 5:
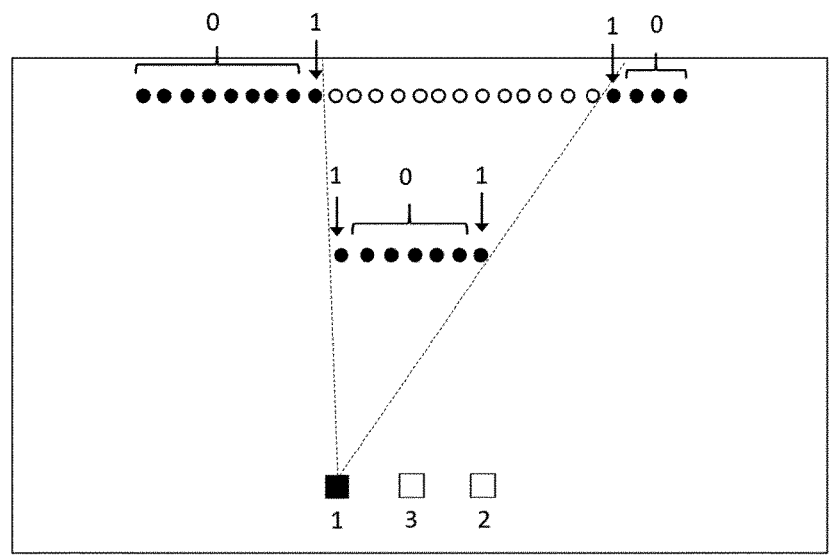
FIG. 5 illustrates an example of a view point transformation for a scene with one background object and a foreground object.
Figure 5:
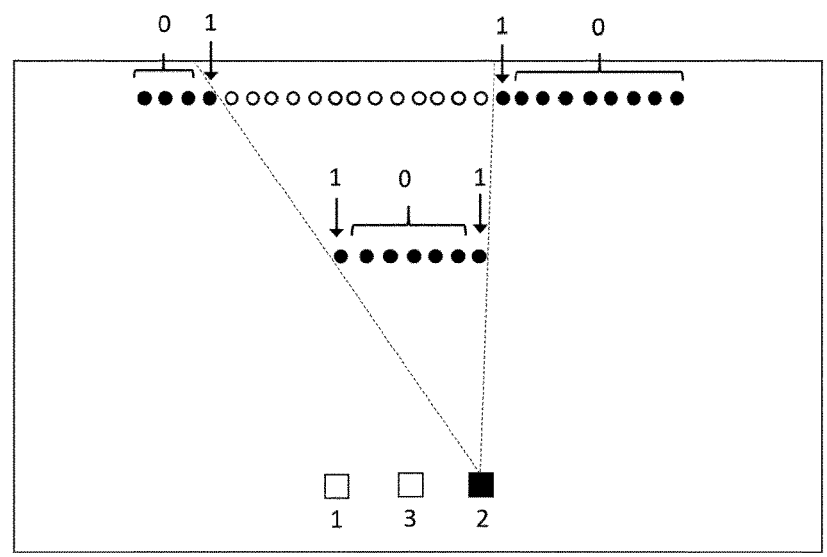
Figure 5:
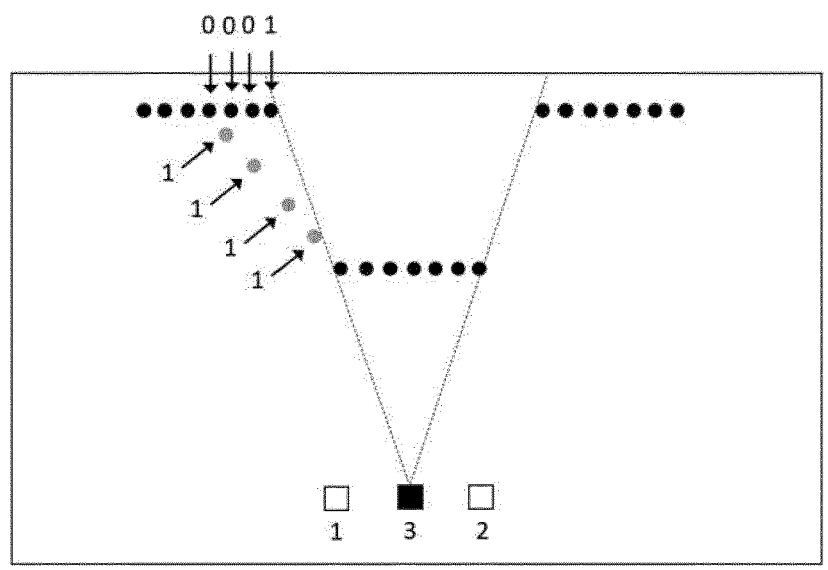

The effect may be illustrated with respect to the example of FIG. 5 which corresponds to that of FIG. 1.

In the example, a very simple indication of the depth gradient is used wherein a value of 1 is assigned to positions wherein the depth gradient magnitude exceeds a threshold whereas the value of 0 is assigned otherwise. FIGS. 5a and b illustrate the gradient magnitude values of either 0 (in a constant region) or 1 (around a depth jump) for view point 1 and 2 respectively. FIG. 5c illustrates the result after warping/view point transforming to the third view point. Again, the grey dots indicate values derived by interpolation.

For a given position in the output light intensity image, i.e. for a given perspective line from view point 3, the output light intensity value is now determined as the weighted combination of the corresponding light intensity values in the two generated images. The image having a lower depth gradient magnitude will be weighted higher and thus in the example, the flat black dots behind the grey dots in front will be weighted higher, and typically much higher. Accordingly, the output value will predominantly be given by the value of the image which includes actual information of the background object rather than by the interpolated de-occluded values. The approach has been found to provide a very substantial improvement and in particular to provide substantially improved quality in de-occluded areas.

It will be appreciated that different weighted combinations may be used in different embodiments. As a specific example, a weighted linear combination may be used. For example, for each pixel in the output image for the third view point, the following combination may be performed:

$$c_3 = \frac{\tilde{w}_1 \tilde{c}_1 + \tilde{w}_2 \tilde{c}_2}{\tilde{w}_1 + \tilde{w}_2}.$$

The tilde ~ denotes that the corresponding variable has been transformed to the output coordinate system/grid of the third view point via a view point transformation. When variables are denoted without a tilde they are still implicitly represented in the original coordinates. As an alternative to the previous combination, the weighting may be performed as:

$$c_3 = \begin{cases} \dfrac{\tilde{w}_1 \tilde{c}_1 + \tilde{w}_2 \tilde{c}_2}{\tilde{w}_1 + \tilde{w}_2} & \text{if } \tilde{w}_1 < F \cdot \tilde{w}_{1,2,max} \\ \tilde{c}_1 & \text{otherwise} \end{cases},$$

where F is fixed fraction and $\tilde{w}_{1,2,max}$ is the maximum value that both weights can take on. Fraction F is typically in the range 0.1 to 0.3 and preferably closer to 0.1 than to 0.3.

In this case the weighting is performed only for spatial locations at which the first view point has a low confidence. This has the advantage that in areas where the first view point is accurate (high weight value $\tilde{w}_1$), the image quality is not degraded due to a non-perfect texture alignment of the warped first and second view point.

The weights in the previous equations depend on the local gradient magnitude in the original mesh image:

$$w_1 = f(g_1), w_2 = f(g_2).$$

Function $f$ is a typically a monotonically decreasing function of the gradient magnitude, i.e. a large gradient magnitude results in a small weight for the corresponding texture in the blending operation.

As an example for the data in FIG. 5, $f$ may be given by:

$$f=e^{-10g}.$$

When the gradient magnitude g=0 then the weights will be 1. When the gradient magnitude g=1 then the weights will be $4.54 \cdot 10^{-5}$.

As an example, considering FIG. 5 for view-point 3 (FIG. 5c), it can be see that the first 3 samples from left-to-right originating from view point 2 will receive a relatively large weight of 1 since the gradient magnitude is zero. However, source sample 4 and 5 from left-to-right in view point 2 have a gradient magnitude of 1 (gradient above a threshold). The interpolated (gray) samples 4,5,6 in output view point 3 are interpolated between these two values and therefore all receive an interpolated gradient magnitude value of 1 with an associated very small weight of $4.54 \cdot 10^{-5}$. The weights originating from view point 1 will be high (1) for these samples which means that for gray samples 4,5,6 in output view 3 the hidden surface from view point 1 will be entirely visible. Sample 7 in output view point 3 combines a small weight of $4.54 \cdot 10^{-5}$, originating from view point 1, with a small weight of $4.54 \cdot 10^{-5}$, originating from view point 2. The result is that the textures at that location are blended with equal weight.

In the examples above, the weight for a given mesh image depended only on the (warped) depth gradient for that mesh image. However, in other embodiments, the weight for one light intensity value may depend on both the local gradient in the first and in the second mesh images.

For example, the first weight may be given as:

$$w_1=f(g_1,g_2),$$

where $g_1$ is the local gradient magnitude in the first mesh, $g_2$ is the local gradient magnitude in the second mesh, and f is a monotonically decreasing function of $g_1$ and a monotonically increasing function of $g_2$.

In some embodiments, $w_2$ may be directly given from $w_1$. For example, f may be restricted to the range from 0 to one and the second weight may simply be given as:

$$w_2=1-w_1$$

The proposed weighting approach has as advantage that the mesh for each original view point does not need to be 'cut' at depth discontinuities using thresholding. Information from the different view-points is merged in a soft manner (blended together), an operation that in general gives better results than using thresholding.

Figure 6:
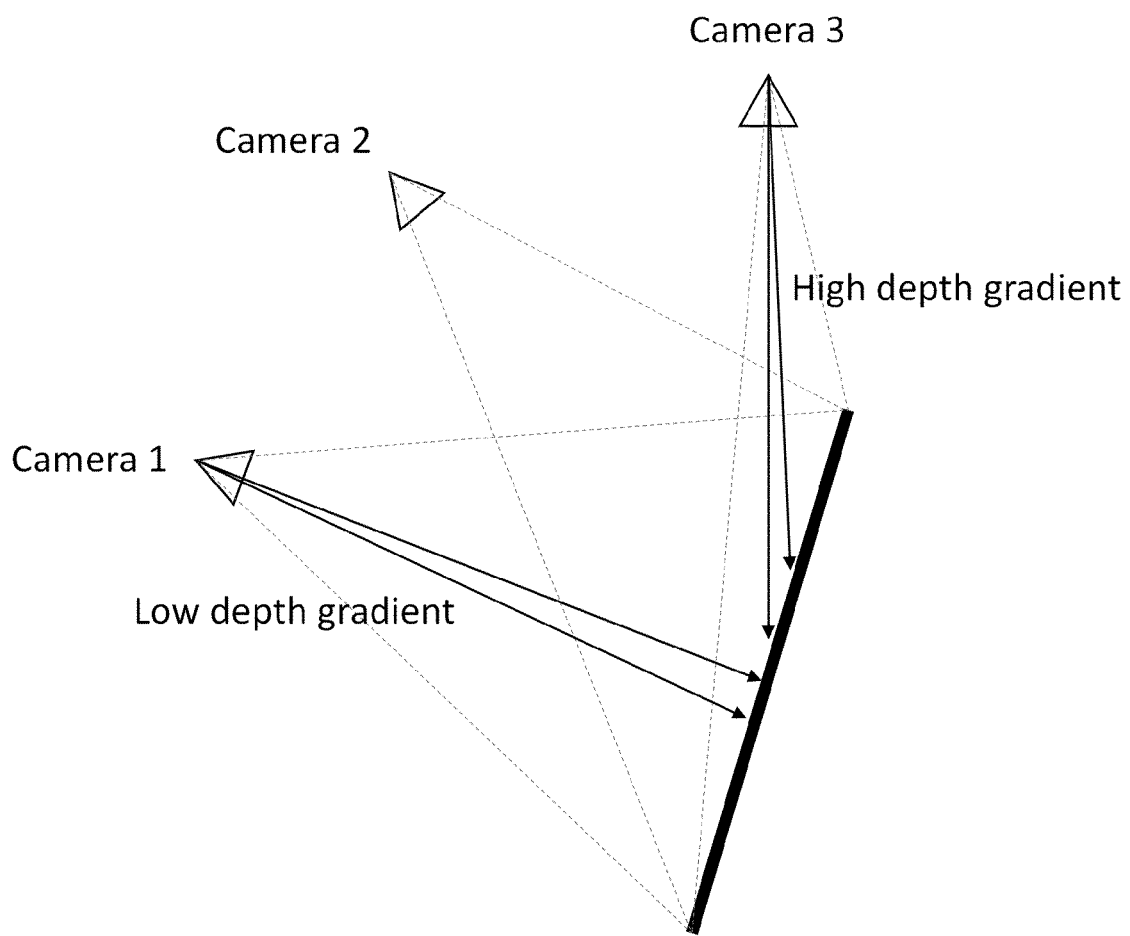
FIG. 6 illustrates an example of depth gradients for different view points.

Another advantage of the approach is that on slanted surfaces the camera that delivers the highest sample density will automatically receive the highest weight in the combination/blend operation. This mechanism is illustrated in FIG. 6.

The gradient based weighting above is local, i.e. the variables depend implicitly on spatial location. For simplicity of notation this location dependence was dropped from the above equations. To make these explicit, the following substitutions could be made:

$g \equiv g_k$
$f \equiv f_k$
$w \equiv w_k$
$c \equiv c_k$ where k is either the index of a mesh vertex or the index of a 2D image coordinate: $(x_k,y_k)$ for a given view-point.

Figure 7:
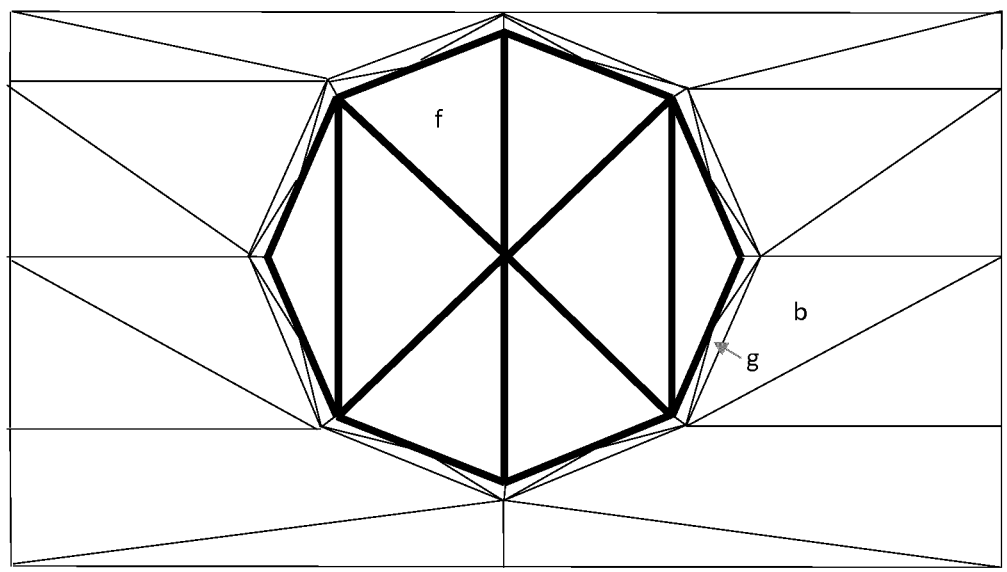
FIG. 7 illustrates an example of a view point transformation for a mesh.
Figure 7:
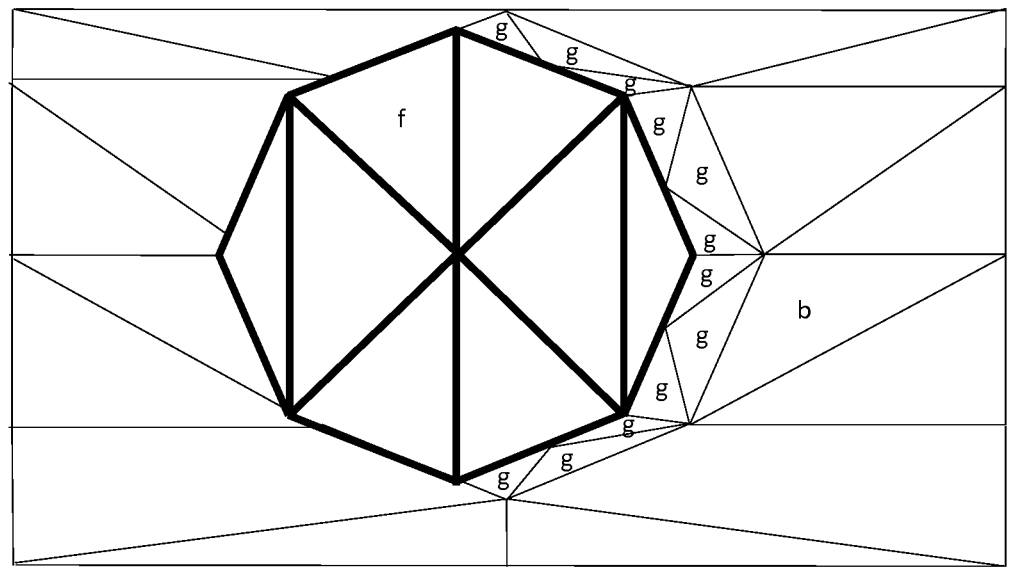

FIG. 5 illustrates the effect with respect to a one-dimensional representation. FIG. 7 illustrates a corresponding scenario with respect to a two dimensional representation of a mesh. In the example, the first figure illustrates a mesh for the first view point and the second figure illustrates the corresponding mesh after being warped to the third view point. In the example of the first figure, polygons bordered by thick edges are at a constant depth in the foreground (f) and polygons bordered by thin edges only are at constant depth in the background (b). Polygons bordered by both thick and thin edges have varying depth and thus a large gradient. If a view point transformation is applied, the foreground object shifts, and as a result, the mesh is stretched locally as shown at the second figure. This stretched region is where the described approach allows a potential background texture to appear.

Another very significant advantage of the approach is that the operations performed by the first view transformer 207 and the second view transformer 209 may in many embodiments be performed by standard hardware optimized graphics processing. For example, the described processing of the two view transformers 205, 207 may be performed by a GPU supporting for example the OpenGL standard. This may reduce cost, facilitate design and implementation, and provide a more efficient implementation with typically much increased processing speeds. Further, the operation of the combiner 211 is an operation that is supported as a user definable processing. Indeed, it may fit in the graphics processing pipeline in accordance with e.g. the OpenGL standard, i.e. it is an operation that can be performed in stages of the pipeline which allows user adaptation and programming. Specifically, it can be performed in the fragment shader stage of an OpenGL rendering pipeline.

Different approaches for determining the gradient magnitudes may be used in different embodiments. In many embodiments, the gradient magnitudes may be determined locally by the apparatus. In the example of FIG. 2, the image generator 205 further comprises a depth gradient processor 213 which is arranged to determine the local gradient magnitudes.

In some embodiments, the depth gradient processor 213 may be arranged to generate depth gradients for vertices of the original meshes. For example, for each vertex in the first mesh, a depth gradient may be determined and associated with the vertex. The gradient for a given position in the output light intensity image may then be determined based on these vertex depth gradients. For example, an approach corresponding to that previously described for generating light intensity values by the view transformers 207, 209 may be used, i.e. the polygon in the mesh corresponding to the position in the light intensity image may be determined and interpolation of the depth gradients for the vertices of the polygon may be used to determine the depth gradient at the position. This can then be used in the weighting.

In some embodiments, the depth gradients may be used to determine a depth gradient map. Specifically, a depth gradient map may be determined which for each position in the texture map has a depth gradient (specifically a depth gradient magnitude). Thus, the depth gradient may have the same resolution as the texture map (although this is not necessary in all embodiments). The depth gradient values for a given pixel position may e.g. be determined by interpolation from the depth gradients of vertices of the polygon in which the pixel position falls.

The resulting depth gradient map may then be view transformed to the third view point. This view point transformation may for example use the exact same view point transformation processing as is used for the texture map. Thus, the depth gradient processor 213 may generate a depth gradient map comprising a depth gradient for each pixel of the first texture map. This determination may be based on determining a depth gradient for each vertex of the first mesh. The depth gradient map is then fed to the first view transformer 207 together with the first mesh and the exact same processing is applied as to the first texture map when generated the first transformed image/texture map. As a result, a warped depth gradient map is provided which is exactly aligned with the warped image. Thus, when combining the warped images, the weights for a given pixel can directly be determined from the depth gradients at the same pixel position in the two warped/transformed depth gradient maps.

This approach may in many embodiments be extremely efficient as it may allow the exact same processing to be used. Indeed, the depth gradient map may be indistinguishable from a texture map (they may both simply be a map of values) and thus can be processed exactly as if it were a texture map. This may allow accelerated graphics hardware to be used for the process and thus provide fast and efficient processing. It further facilitates the combination as this can simply retrieve the corresponding values from the transformed depth gradient maps.

The approach for determining depth gradients for the vertices may be different in different embodiments. In many embodiments, the depth gradient for a given vertex may be determined based on the depth of that vertex and the depth of at least one other vertex in the mesh, typically a neighboring vertex. Specifically, the depth gradient may be determined in response to the difference in the depths for the two vertices. Further, as the distance between vertices in a mesh may typically vary, the depth difference may be compensated for the distance between them. In many embodiments, a depth gradient may be determined as the depth difference between two vertices divided by the distance between them.

In case the 3D mesh is derived from a dense depth or disparity map, then the gradient at a given vertex may be taken from its location in a gradient map that is derived from the disparity map. In this way, the depth gradient information is created when the mesh is created from the depth map.

In some embodiments, only one other vertex may be considered, e.g. the nearest one, but in most embodiments, the depth gradient for a given vertex is determined based on an averaging of depth gradients from the vertex to a plurality of neighboring vertices. This may specifically allow depth variations in multiple directions to be considered. Typically, all neighboring vertices are considered in order to ensure that all depth variations are considered (e.g. at the edge of an object a depth transition may result in a very high gradient in one direction while being very low in e.g. the opposite direction).

The approach may also allow efficient gradient determination for meshes where the polygons may vary substantially in size. For example, when considering typical 3D data in the form of a mesh generated from camera capture, care must be taking when calculating the gradient. In this case, for compression efficiency reasons, the mesh may often be represented by larger triangles for so called flat areas were the depth does not change rapidly as a function of spatial coordinates. Conversely, at depth discontinuities, triangles in the mesh are small to represent the depth step. However, this may be compensated for in the described approach of determining the average absolute change in depth over all neighboring vertices in the graph and normalizing each neighbor contribution by the length of 2D edge.

For example, the following equation may be used:

$$g_k = \frac{\sum_m \left( \frac{|D_k(u,v) - D_m(u,v)|}{\sqrt{(u_k - u_m)^2 + (v_k - v_m)^2}} \right)}{N}$$

where N is the number of neighboring vertices m of vertex k, and (u,v) refers to the position in the texture map, and D refers to the depth.

In some embodiments, the depth gradient processor 213 may be arranged to determine the depth gradients in response to depth variations in a depth map for the first texture map. Thus, rather than (or possibly as well as) the depth gradient processor 213 determining the depth gradient in response to the vertex depths, it may process a depth map to determine the gradients. For example, in many embodiments, a camera may directly provide an image and associated depth map. This may be converted into a mesh and a texture map (with the texture map typically directly being the captured image). The depth gradient processor 213 may in this case directly process the original depth map to generate a depth map gradient. For example, for a given pixel, the depth variations in e.g. four or eight different directions may be determined and the gradient may be set as the average or the highest gradient out of these.

This may in many embodiments provide a low complexity determination of an accurate depth gradient map. The depth gradient map may then be warped to the third view point as previously described for the depth gradient map determined based on vertices.

In the previous examples, a depth gradient map was generated and then warped to the third view point with the weights then being determined prior to the combination. However, in other embodiments, the weight determination may be performed prior to the warping.

For example, a first weight map may be generated for the first mesh image by applying a function to the depth gradient for each pixel. E.g., the function $$w_1 = f(g_1)$$

may be used.

The same may be done for the second mesh image thus resulting in two weight maps for respectively the first and second mesh images respectively. These weight maps may then be warped to the third view point and the weights of the transformed weight maps may be used directly in the combination.

In some embodiments, the determination of a weight for a given pixel position may be dependent on both the depth gradient for the first and the second mesh image, e.g.:

$$w_1 = f(g_1, g_2).$$

In some embodiments, only a single weight map may be determined. For example, in some embodiments the weights applied in the combination may be arranged to always add to one, i.e. $w_1 + w_2 = 1$. In this case, only the weight map for $w_1$ may be determined and warped to the third view point.

A particular advantage of the approach of using depth gradient or weight maps provides a very efficient processing in many embodiments. In particular, it allows the same view point transformation to be applied to the depth gradient/weight map as is applied to the texture map, and specifically the same view point transformation based on the same mesh may be used. This specifically in many embodiments allows for efficient accelerated hardware graphics processing to be used.

In many embodiments, the weights of the combination may further be in response to other parameters. In many embodiments, the weights may further be dependent on the difference between the first view point and the third view point. Specifically, the larger the difference the lower the weight will be. The difference may for example be determined as a geometric difference between x, y, z coordinates between the view points or may e.g. be determined directly from a view point change parameter provided to the image generator 205. The approach may weigh smaller view point transformations higher than larger transformations reflecting the fact that the smaller the change in view point the higher the quality.

Thus, in some embodiments, the weight(s) may also depend on a global parameter that measures how much (e.g. in terms of angular difference) the output view-point (the third view point) differs from the input view point. If this angular difference is large, the weight could be selected to be lower such that nearby cameras have a larger contribution in the blend operation.

In some embodiments, the weighting may be dependent on a reliability indication for the first gradients where the reliability indication is indicative of a reliability of a depth estimation used to determine a depth at the first mesh position.

Many depth cameras or depth estimation techniques provide a reliability indication which indicates how reliable the generated depth estimate is considered to be. For example, a depth sensor, whether that is a stereo pair or structured light sensor, typically have an associated uncertainty. This uncertainty can come from the disparity estimation process or from the infrared measurement process of the depth sensor. The reliability information may for example be provided as a pixel confidence map. In such a case, pixels with a higher uncertainty may be weighted lower in the combination than pixels with a lower uncertainty. The uncertainty may for example be considered when determining a weight map prior to view point transformation or e.g. the confidence map may be warped to the third view point and considered when determining weights in the third view point domain.

In some embodiments, the depth gradient or weight may be provided from an internal or external source, e.g. it may be read from a video file or calculated from a disparity/depth map read from a video file. The first option may have the advantage that other confidences may be combined with the gradient based confidence into a single confidence map. Part of this confidence may be output from the depth sensor or disparity estimation step and this may be encoded in the video stream.

It should be noted that the depth gradient value could be considered to be akin to a confidence value in the sense that a higher value (indicating a higher gradient) is used to reduce the weighting. Accordingly, in many scenarios, a depth estimation confidence value and the depth gradient value may directly be combined to provide a combined overall confidence value for the pixel. The higher the depth estimation confidence value and the lower the depth gradient, the higher the confidence that the corresponding light intensity value is suitable for generating the output value, and thus the higher the weight.

It should be noted that the depth gradient may be determined at different times and by different functional entities in different embodiments. For example, in some embodiments, two (or more) video streams may be provided each comprising a sequence of images and associated depth maps. A rendering apparatus may then proceed to generate the corresponding meshes and e.g. generate a depth gradient map based on the depth map. It may then proceed to warp the depth gradient map and the texture map to the new view point based on the determined mesh. Indeed, in some embodiments, each video stream for a given view point may not even include a depth map but may instead e.g. be in the form of stereo images. In this case, the rendering apparatus may further be arranged to perform disparity estimation to generate explicit depth information based on which the mesh and depth gradient maps can be generated.

However, in other embodiments, some of these functions may be performed at the content provider side. For example, when capturing a scene using a plurality of stereo cameras at different positions, a content provider entity may proceed to perform disparity estimation for each of these and may generate a depth map. It may then proceed to determine a depth gradient map (or indeed a weight map) for the depth map as well as a mesh. In this case, a video signal may be generated which for each camera view point includes a video sequence comprising a set of texture maps, meshes, and depth gradient maps for each camera view point. In many embodiments, a depth estimation confidence map is further provided to indicate the reliability of the disparity estimation. This information may be provided as a separate confidence map or may be combined with the depth gradient map as previously described.

This video signal may then be distributed, potentially to a large number of end users. A rendering unit may in this case simply proceed to generate an image for a new view point by for each camera view point warping the texture map and the gradient map (and possibly the confidence map) to the desired view point based on the mesh. For each pixel in the output image, the warped texture values at that position are then combined based on the warped gradient values at that position (and possibly the confidence values). This provides a highly efficient process as the only functions required are a low resource weighted combination and standardized view transformations (warpings) that can be performed efficiently by dedicated hardware.

The approach may provide very efficient operation while maintaining low resource requirements. Indeed, it is foreseen that the functionality may be embedded e.g. into 3D glasses which may simply be provided directly with such a video signal yet be able to provide a dynamic virtual reality experience of high quality based on this.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc. do not preclude a plurality. Reference signs in the claims are provided merely as a clarifying example shall not be construed as limiting the scope of the claims in any way.

The invention claimed is:

1. A method of generating a light intensity image, the method comprising:
receiving a first texture map and a first mesh, wherein the first mesh represents a scene from a first view point;
receiving a second texture map and a second mesh, wherein the second mesh represents the scene from a second view point;
determining the light intensity image representing the scene from a third view point in response to the first texture map, the first mesh, the second texture map and the second mesh,
wherein determining the light intensity image comprises for a first position in the light intensity image performing the steps of:
determining a first light intensity value for the first position by a view point transformation based on the first texture map and the first mesh;
determining a second light intensity value for the first position by a view point transformation based on the second texture map and the second mesh;
determining a light intensity value for the light intensity image at the first position by a weighted combination of the first light intensity value and the second light intensity value,
wherein a weighting of the first light intensity value relative to the second light intensity value by the weighted combination is dependent on a first depth gradient in the first mesh at a first mesh position corresponding to the first position relative to a second depth gradient in the second mesh at a second mesh position corresponding to the first position.

2. The method of claim 1,
wherein the weighting comprises a weighting of the first light intensity value relative to the second light intensity value,
wherein the weighting of the first light intensity value is a monotonically decreasing function of the absolute value of the first depth gradient.

3. The method of claim 1,
wherein the weighting comprises a weighting of the first light intensity value relative to the second light intensity value,
wherein the weighting of the first light intensity value is a monotonically increasing function of the absolute value of the second depth gradient.

4. The method of claim 1 further comprising:
determining depth gradients for at least some vertices of the first mesh; and
determining the first depth gradient in response to the depth gradients for the at least some vertices.

5. The method of claim 4, wherein determining the depth gradients comprises determining a depth gradient for a vertex of the at least some vertices of the first mesh in response to a depth of the vertex, a depth of at least one other vertex of the first mesh, and a distance between the vertex and the at least one other vertex.

6. The method of claim 4, wherein determining depth gradients comprises determining a depth gradient for a vertex of the at least some vertices of the first mesh in response to depth gradients from the vertex to a plurality of neighboring vertices.

7. The method of claim 1 further comprising determining the first depth gradient in response to depth variations in a depth map for the first texture map.

8. The method of claim 1 further comprising the steps of:
determining a depth gradient map for the first texture map;
applying a view point transformation to the depth gradient map to generate a view transformed depth gradient map, and
determining the first depth gradient in response to a depth gradient at a position in the view transformed depth gradient map corresponding to the first position.

9. The method of claim 8, wherein the view point transformations for the first texture map, the second texture map, and at least one of the depth gradient map and the weight map are the same view point transformation.

10. The method of claim 1 further comprising the steps of:
determining a weight map, wherein the weight map comprises weights for the weighted combination in response to the depth gradients;
applying a view point transformation to the weight map to generate a view transformed weight map, and
determining a weight for the weighted combination in response to a weight at the first position in the view transformed depth gradient map.

11. The method of claim 10, wherein the view point transformations for the first texture map, the second texture map, and at least one of the depth gradient map and the weight map are the same view point transformation.

12. The method of claim 1, wherein the first texture map and the first mesh is generated from a capture of a real-life scene.

13. The method of claim 1, wherein the weighting is further dependent on a difference between the first view point and the third view point.

14. The method of claim 1,
wherein the weighting of the first light intensity value relative to the second light intensity value is dependent on a reliability indication,
wherein the reliability indication is indicative of a reliability of a depth estimation,
wherein the depth estimation is used to determine a depth at the first mesh position in the first depth map,
wherein the weighting of the first light intensity value relative to the second light intensity value increasing for the reliability indication is indicative of an increasing reliability of the depth estimation.

15. A computer program disposed on a non-transient medium, wherein the computer program is arranged to perform the method of claim 1.

16. An apparatus for generating a light intensity image, the apparatus comprising:
a first receiver,
wherein the first receiver is arranged to receive a first texture map and a first mesh,
wherein the first mesh represents a scene from a first view point;
a second receiver,
wherein the second receiver is arranged to receive a second texture map and a second mesh,
wherein the second mesh represents the scene from a second view point;
an image generator circuit, wherein the image generator circuit is arranged to determine a light intensity image representing the scene from a third view point in response to the first texture map, the first mesh, the second texture map, and the second mesh
the image generator circuit comprises:
a first view transformer,
wherein the first view transformer is arranged to determine a first light intensity value for a first position in the light intensity image,
wherein first light intensity value is determined by a view point transformation based on the first texture map and the first mesh;
a second view transformer,
wherein the second view transformer is arranged to determine a second light intensity value for the first position,
wherein second light intensity value is determined by a view point transformation based on the second texture map and the second mesh;
a combiner, wherein the combiner is arranged to determine a light intensity value for the light intensity image at the first position by a weighted combination of the first light intensity value and the second light intensity value,
wherein a weighting of the first light intensity value relative to the second light intensity value by the weighted combination is dependent on a first depth gradient in the first mesh at a first mesh position corresponding to the first position relative to a second depth gradient in the second mesh at a second mesh position corresponding to the first position.

17. The apparatus of claim 16,
wherein the weighting comprises a weighting of the first light intensity value relative to the second light intensity value,
wherein the weighting of the first light intensity value is a monotonically decreasing function of the absolute value of the first depth gradient.

18. The apparatus of claim 16,
wherein the weighting comprises a weighting of the first light intensity value relative to the second light intensity value,
wherein the weighting of the first light intensity value is a monotonically increasing function of the absolute value of the second depth gradient.

19. The apparatus of claim 16, wherein the view point transformations for the first texture map, the second texture map, and at least one of the depth gradient map and the weight map are the same view point transformation.

20. The apparatus of claim 16, wherein the first texture map and the first mesh is generated from a capture of a real-life scene.

* * * * *